(12) United States Patent
Shimazawa et al.

(10) Patent No.: US 8,023,226 B2
(45) Date of Patent: Sep. 20, 2011

(54) THERMALLY ASSISTED MAGNETIC HEAD, HEAD GIMBAL ASSEMBLY, AND HARD DISK DRIVE

(75) Inventors: Koji Shimazawa, Tokyo (JP); Kosuke Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 576 days.

(21) Appl. No.: 12/182,744

(22) Filed: Jul. 30, 2008

(65) Prior Publication Data
US 2009/0040645 A1 Feb. 12, 2009

(30) Foreign Application Priority Data
Aug. 10, 2007 (JP) .................. 2007-209982

(51) Int. Cl.
*G11B 11/105* (2006.01)
(52) U.S. Cl. ................. 360/125.74
(58) Field of Classification Search .......... 360/125.74
See application file for complete search history.

(56) References Cited

U.S. PATENT DOCUMENTS

| | | | |
|---|---|---|---|
| 2005/0190496 A1* | 9/2005 | Hamann et al. | 360/128 |
| 2007/0177302 A1 | 8/2007 | Shimazawa et al. | |
| 2007/0230048 A1* | 10/2007 | Hasegawa | 360/126 |
| 2008/0218891 A1* | 9/2008 | Gubbins et al. | 360/59 |

FOREIGN PATENT DOCUMENTS

| | | |
|---|---|---|
| JP | A-5-334606 | 12/1993 |
| JP | A 10-162444 | 6/1998 |
| JP | A 2001-255254 | 9/2001 |
| JP | A-2004-87068 | 3/2004 |
| JP | A 2004-158067 | 6/2004 |
| JP | A 2006-185548 | 7/2006 |
| JP | A-2007-200505 | 8/2007 |

OTHER PUBLICATIONS

Miyanishi et al., "Near-Field Assisted Magnetic Recording," *IEEE Transactions on Magnetics*, vol. 41, No. 10, Oct. 2005, pp. 2817-2821.

* cited by examiner

*Primary Examiner* — Mark Blouin
(74) *Attorney, Agent, or Firm* — Oliff & Berridge, PLC

(57) ABSTRACT

A thermally assisted magnetic head comprises a slider having a medium-opposing surface and a light source unit secured to a surface of the slider on the side of the slider opposite from the medium-opposing surface. The slider has a slider substrate and a magnetic head part provided on a side face of the medium-opposing surface in the slider substrate. The magnetic head part includes a magnetic recording device for generating a magnetic field and a waveguide for receiving light from an end face opposite from the medium-opposing surface and guiding the light to the medium-opposing surface side. The light source unit has a light source supporting substrate, a light source secured to the light source supporting substrate and adapted to supply light to the end face of the waveguide, and a temperature sensor for measuring the temperature of the light source.

9 Claims, 8 Drawing Sheets

THERMALLY ASSISTED MAGNETIC HEAD, HEAD GIMBAL ASSEMBLY, AND HARD DISK DRIVE

BACKGROUND OF THE INVENTION

1. Field of the Invention

The present invention relates to a thermally assisted magnetic head which writes signals by a thermally assisted magnetic recording scheme, a head gimbal assembly (HGA) equipped with the thermally assisted magnetic head, and a hard disk drive equipped with the HGA.

2. Related Background Art

As hard disk drives have been increasing their recording density, thin-film magnetic heads have been required to further improve their performances. As the thin-film magnetic heads, those of composite type having a structure in which a magnetism detecting device such as magnetoresistive (MR) device and a magnetic recording device such as electromagnetic coil device are laminated have been in wide use, while these devices read/write data signals from/onto magnetic disks which are magnetic recording media.

In general, a magnetic recording medium is a sort of discontinuous body in which magnetic fine particles are assembled, while each magnetic fine particle has a single-domain structure. Here, one recording bit is constituted by a plurality of magnetic fine particles. Therefore, for enhancing the recording density, it is necessary to make the magnetic fine particles smaller, so as to reduce irregularities at boundaries of recording bits. When the magnetic fine particles are made smaller, however, their volume decreases, so that the thermal stability in magnetization may deteriorate, thereby causing a problem.

An index of the thermal stability in magnetization is given by $K_U V/k_B T$. Here, $K_U$ is the magnetic anisotropy energy, V is the volume of one magnetic fine particle, $k_B$ is the Boltzmann constant, and T is the absolute temperature. Making the magnetic fine particles smaller just reduces V, thereby lowering $K_U V/k_B T$ by itself, which worsens the thermal stability. Though $K_U$ may be made greater at the same time as measures against this problem, the increase in $K_U$ enhances the coercivity of the recording medium. On the other hand, the writing magnetic field intensity caused by a magnetic head is substantially determined by the saturated magnetic flux density of a soft magnetic material constituting a magnetic pole within the head. Therefore, no writing can be made if the coercivity exceeds a permissible value determined by the limit of writing magnetic field intensity.

Proposed as a method for solving such a problem in thermal stability of magnetization is a so-called thermally assisted magnetic recording scheme which imparts heat to a part of a recording medium by irradiation with light from a light source at the time of applying a writing magnetic field, while using a magnetic material having a large value of $K_U$, so as to effect writing with lowered coercivity by a magnetic recording device (see, for example, Japanese Patent Application Laid-Open No. 10-162444, No. 2001-255254, No. 2004-158067, No. 2006-185548, IEEE Trans. Magn. Vol. 41, pp. 2817-2821 (2005)).

SUMMARY OF THE INVENTION

Meanwhile, a light source such as laser diode greatly varies its intensity of output light depending on temperature even when the same power is fed thereto. Variations in the intensity of output light are unfavorable in that the recording medium may be heated insufficiently, whereby the writing may become incomplete, or the recording medium may be heated too much, whereby the writing may extend to unintended parts. Though the intensity of light outputted from the light source such as laser diode may directly be monitored by a light-receiving device such as photodiode, so as to be controlled, it undesirably complicates the structure.

In view of such a problem, it is an object of the present invention to provide a thermally assisted magnetic head which can stabilize the intensity of light from a light source, an HGA equipped with this thermally assisted magnetic head, a hard disk drive equipped with this HGA, and a light source unit for the thermally assisted magnetic head.

The thermally assisted magnetic head in accordance with the present invention comprises a magnetic recording device for generating a magnetic field, a light source for supplying light, and a temperature sensor for measuring a temperature of the light source.

Since the temperature sensor for measuring the temperature of the light source is provided, the present invention makes it easy for the light source to keep a constant light output according to temperature information from the temperature sensor regardless of its temperature.

Preferably, the thermally assisted magnetic head in accordance with the present invention further comprises a slider substrate and a light source supporting substrate secured to a surface of the slider substrate on the side opposite from a medium-opposing surface; wherein a side face of the medium-opposing surface in the slider substrate is provided with the magnetic recording device and a waveguide for receiving the light from the side opposite from the medium-opposing surface and guiding the light to the medium-opposing surface side; wherein the light source is secured to the light source supporting substrate and supplies the light to the waveguide; and wherein the temperature sensor is secured to the light source supporting substrate.

In thus constructed thermally assisted magnetic head the slider in which the magnetic recording device and optical waveguide are secured to the slider substrate and the light source unit in which the light source is secured to the light source supporting substrate can be manufactured separately from each other, so that an inspection for the magnetic recording device ad waveguide and an inspection for the state of mounting the light source can be performed separately from each other, whereby the total yield can be improved by combining nondefective products together. Also, since the temperature sensor is secured to the light source supporting substrate for securing the light source, the light source temperature can accurately be measured by the temperature sensor.

Preferably, the temperature sensor is provided between the light source supporting substrate and light source. This makes it possible to arrange the light source and temperature sensor closer to each other and measure the light source temperature more accurately. Also, the manufacture is easy. It will be preferred in particular if the temperature sensor is arranged in an insulating layer provided between the light source supporting substrate and light source.

Preferably, the temperature sensor is a resistance thermometer. This can easily be made smaller and thinner, and thus is suitable for the thermally assisted magnetic head in particular. It will also be preferred if the temperature sensor is a thin film.

The head gimbal assembly in accordance with the present invention comprises the thermally assisted magnetic head in accordance with the present invention and a suspension for supporting the thermally assisted magnetic head.

The hard disk in accordance with the present invention comprises the head gimbal assembly in accordance with the present invention and a light source controller for controlling a light output of the light source according to information from the temperature sensor.

The light source unit for a thermally assisted magnetic head in accordance with the present invention comprises a light source supporting substrate, a light source secured to the light source supporting substrate, and a temperature sensor for measuring a temperature of the light source.

The present invention can provide a thermally assisted magnetic head which can stabilize the intensity of light from a light source, an HGA equipped with this thermally assisted magnetic head, a hard disk drive equipped with this HGA, and a light source unit for the thermally assisted magnetic head.

DESCRIPTION OF THE PREFERRED EMBODIMENTS

Figure 1:
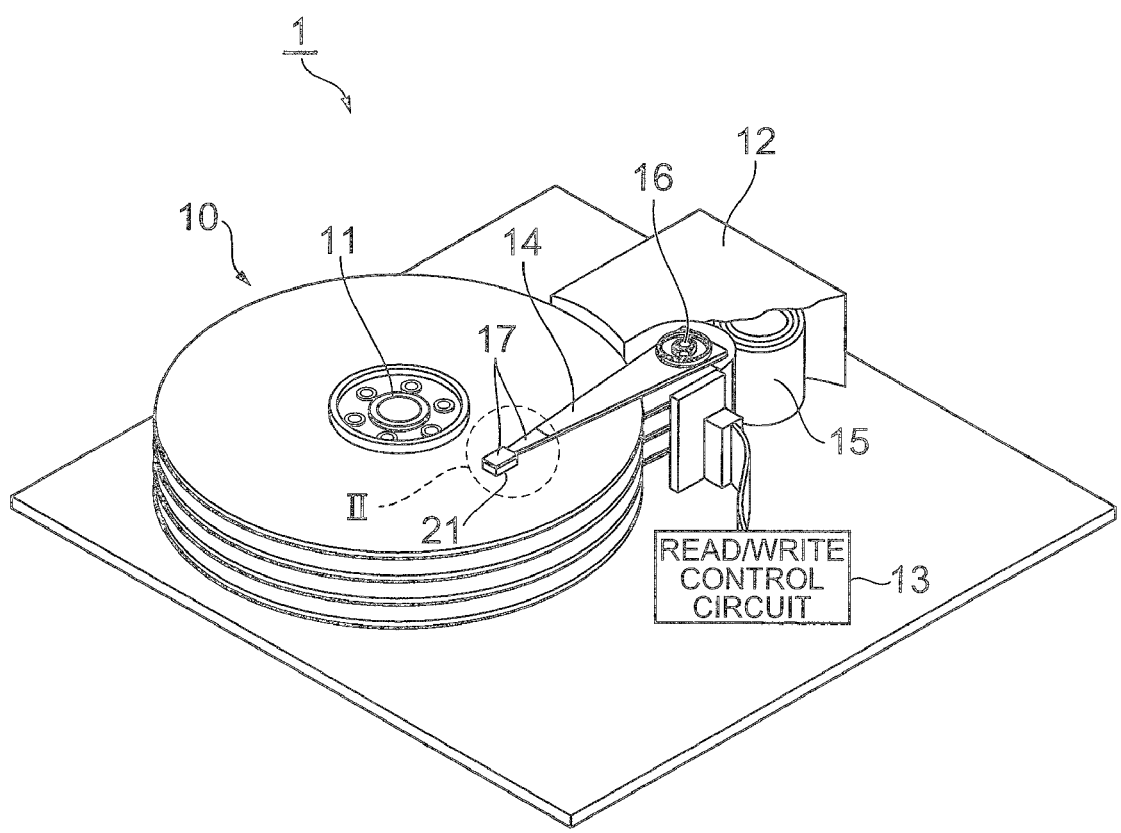
FIG. 1 is a perspective view of the hard disk drive in accordance with an embodiment.

In the following, modes for carrying out the present invention will be explained in detail with reference to the drawings. In the drawings, the same constituents are referred to with the same numerals or letters. For easier viewing of the drawings, ratios of dimensions within and among the constituents in the drawings are arbitrary.

Hard Disk Drive

FIG. 1 is a perspective view of the hard disk drive in accordance with an embodiment.

The hard disk drive 1 comprises a plurality of magnetic disks 10 which are magnetic recording media rotating about a rotary shaft of a spindle motor 11, an assembly carriage apparatus 12 for positioning thermally assisted magnetic heads 21 onto tracks, and a read/write control circuit 13 for controlling writing and reading actions by the thermally assisted magnetic heads 21 and regulating a laser diode 40 which is a light source for generating laser light for thermally assisted magnetic recording as will be explained later in detail.

The assembly carriage apparatus 12 is provided with a plurality of driving arms 14. These driving arms 14 can be swung about a pivot bearing shaft 16 by a voice coil motor (VCM) 15, and are laminated in a direction along the pivot bearing shaft 16. A head gimbal assembly (HGA) 17 is attached to a leading end part of each driving arm 14. Each HGA 17 is provided with the thermally assisted magnetic head 21 opposing the front face of its corresponding magnetic disk 10. In the thermally assisted magnetic head 21, the surface opposing the front face of the magnetic disk 10 is the medium-opposing surface (also known as air bearing surface) S. The magnetic disk 10, driving arm 14, HGA 17, and thermally assisted magnetic head 21 may be provided singly as well.

HGA

Figure 2:
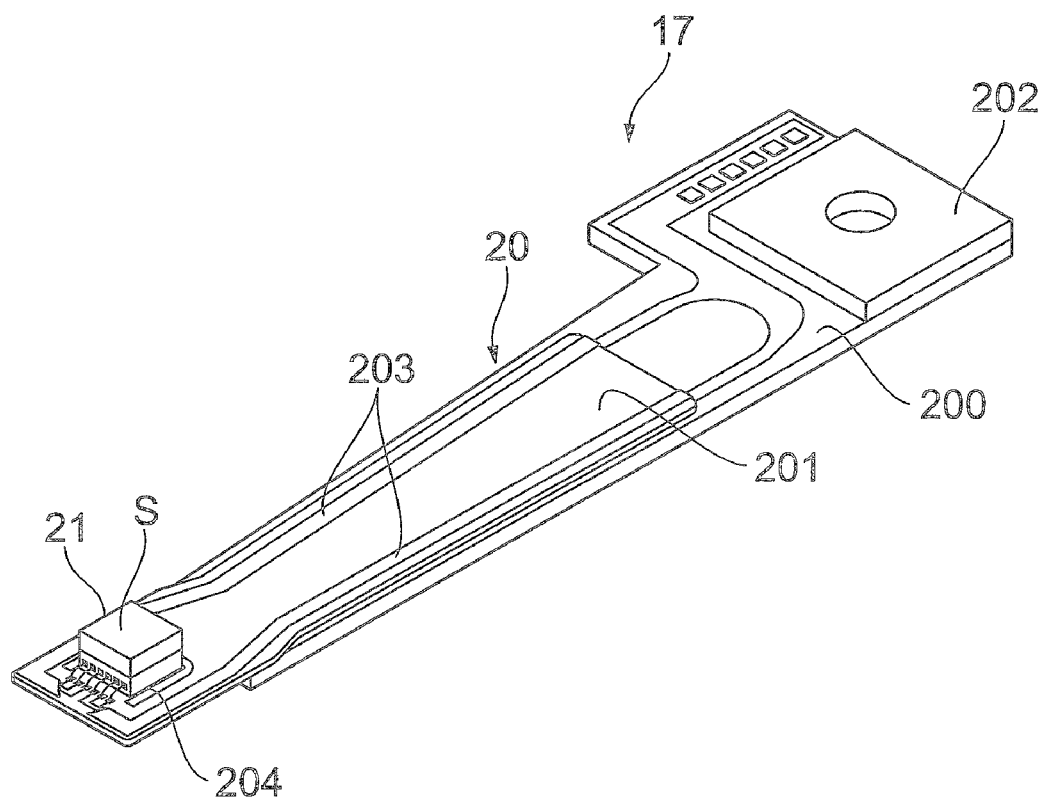
FIG. 2 is a perspective view of an HGA 17.

FIG. 2 is a perspective view of the HGA 17. This drawing shows the HGA 17 with its medium-opposing surface S facing up.

The HGA 17 is constructed by firmly attaching the thermally assisted magnetic head 21 to a leading end part of a suspension 20 and electrically connecting one end of a wiring member 203 to a terminal electrode of the thermally assisted magnetic head 21. The suspension 20 is mainly constituted by a load beam 200, an elastic flexure 201 firmly attached onto and supported by the load beam 200, a tongue 204 formed like a leaf spring at the leading end of the flexure 201, a base plate 202 provided at a base part of the load beam 200, and a wiring member 203 which is formed on the flexure 201 and comprises lead conductors and connecting pads electrically connected to both ends of the lead conductors.

It is clear that the suspension in the HGA 17 is not limited to the structure mentioned above. Though not depicted, an IC chip for driving the head may be mounted somewhere in the suspension 20.

Thermally Assisted Magnetic Head

Figure 3:
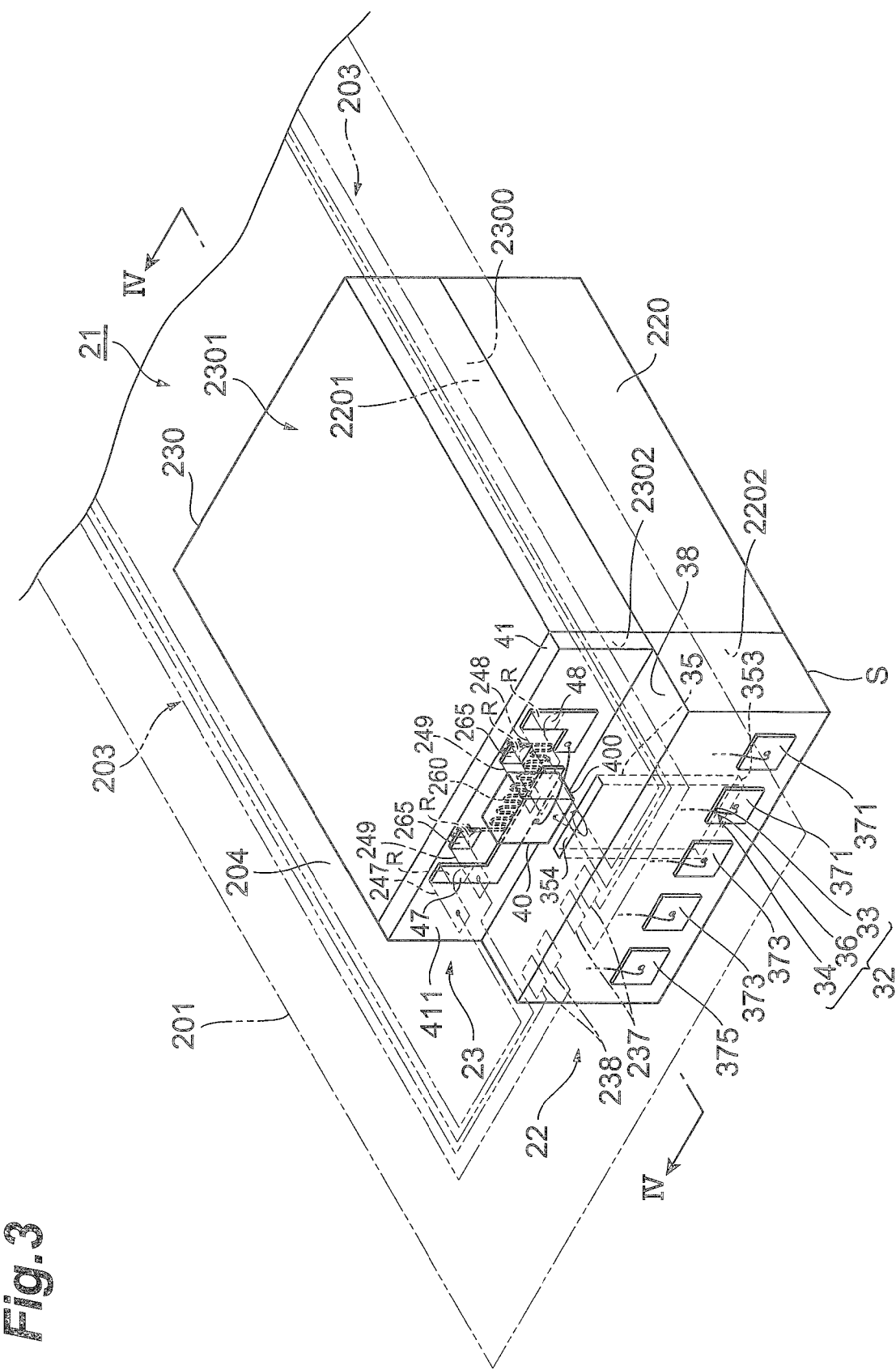
FIG. 3 is an enlarged perspective view of a thermally assisted magnetic head 21 shown in FIG. 1 and its vicinity.
Figure 4:
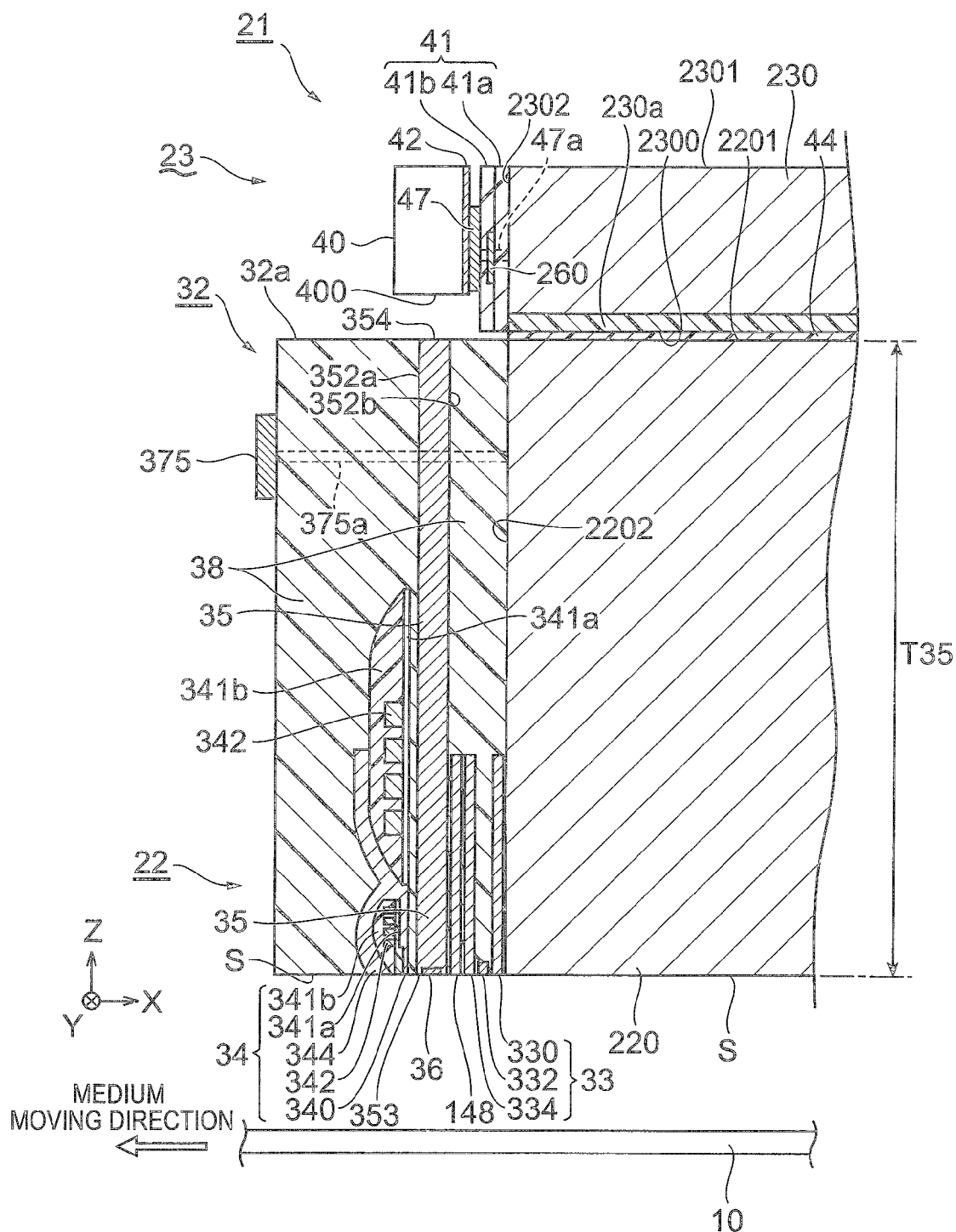
FIG. 4 is a sectional view of the thermally assisted magnetic head 21 taken along the line IV-IV of FIG. 3.

FIG. 3 is an enlarged perspective view of the thermally assisted magnetic head 21 shown in FIG. 1 and its vicinity. FIG. 4 is a sectional view taken along the line IV-IV of FIG. 3.

The thermally assisted magnetic head 21 has a structure in which a slider 22 and a light source unit 23 comprising a light source supporting substrate 230 and a laser diode 40 to become a light source for thermally assisted magnetic recording are bonded and secured to each other such that a back face 2201 of a slider substrate 220 and a bonding surface 2300 of the light source supporting substrate 230 are in contact with each other. The back face 2201 of the slider substrate 220 is a surface of the slider 22 on the side opposite from the medium-opposing surface S. The bottom face 2301 of the light source supporting substrate 230 is bonded to the tongue 204 by an adhesive such as epoxy resin, for example.

The slider 22 comprises the slider substrate 220 and a magnetic head part 32 for writing and reading data signals.

The slider substrate 220 exhibits a planar form and has the medium-opposing surface S processed such as to yield an appropriate flying height. The slider substrate 220 is formed by AlTiC ($Al_2O_3$—TiC) or the like which is conductive.

As shown in FIGS. 3 and 4, the magnetic head part 32 is formed on an integration surface 2202 which is a side face substantially perpendicular to the medium-opposing surface S of the slider substrate 220. The magnetic head part 32 comprises an MR device 33 as a magnetism detecting device for detecting magnetic in formation, an electromagnetic coil device 34 as a perpendicular (or in-plane) magnetic recording device for writing magnetic information by generating a magnetic field, a waveguide 35 as a planar waveguide provided between the MR device 33 and electromagnetic coil device 34, a near-field-light-generating part (also referred to as plasmon probe) 36 for generating near-field light for heating the recording layer part of the magnetic disk, and an insulating layer 38 functioning as a cladding formed on the integration surface 2202 so as to cover the MR device 33, electromagnetic coil device 34, waveguide 35, and near-field-light-generating part 36.

As shown in FIG. 3, the magnetic head part 32 further comprises a pair of signal terminal electrode pads 371, 371 respectively connected to I/O terminals of the MR device 33, a pair of signal terminal electrode pads 373, 373 respectively connected to both ends of the electromagnetic coil device 34, and a grounding electrode pad 375 electrically connected to the slider substrate 220, which are formed on an exposed surface of the insulating layer 38. The electrode pad 375 electrically connected to the slider substrate 220 through a via hole 375a as shown in FIG. 4 is connected to an electrode pad 247 of the flexure 201 with a bonding wire, whereby the potential of the slider substrate 220 is adjusted by the electrode pad 274 to the ground potential, for example.

The MR device 33, electromagnetic coil device 34, and near-field-light-generating part 36 have respective end faces exposed at the medium-opposing surface S.

As shown in FIG. 4, the MR device 33 includes an MR multilayer body 332, and a lower shield layer 330 and an upper shield layer 334 which are arranged at positions holding the MR multilayer body 332 therebetween. Each of the lower and upper shield layers 330, 334 can be constituted by a magnetic material such as NiFe, CoFeNi, CoFe, FeN, or FeZrN having a thickness of about 0.5 to 3 μm formed by pattern plating such as frame plating or the like, for example. The lower and upper shield layers 330, 334 prevent the MR multilayer body 332 from being affected by external magnetic fields which become noise.

The MR multilayer body 332 includes a magnetoresistive film such as CIP (Current in Plane) GMR (Giant Magneto Resistive) multilayer film, CPP (Current Perpendicular to Plane) GMR multilayer film, or TMR (Tunneling Magneto Resistive) multilayer film, and senses signal magnetic fields from magnetic disks with a very high sensitivity.

When including a TMR multilayer film, for example, the MR multilayer body 332 has a structure in which an antiferromagnetic layer having a thickness of about 5 to 15 nm made of IrMn, PtMn, NiMn, RuRhMn, or the like, a magnetization fixed layer which is constituted by a ferromagnetic material such as CoFe or two layers of CoFe or the like holding a nonmagnetic metal layer such as Ru therebetween, for example, and has a direction of magnetization fixed by the antiferromagnetic layer, a tunnel barrier layer made of a nonmagnetic dielectric material formed by oxidizing a metal film having a thickness of about 0.5 to 1 nm made of Al, AlCu, or the like by oxygen introduced into a vacuum apparatus or naturally, for example, and a free magnetization layer which is constituted by a two-layer film constituted by CoFe or the like having a thickness of about 1 nm and NiFe or the like having a thickness of about 3 to 4 nm which are ferromagnetic materials, for example, and forms tunneling exchange coupling with the magnetization fixed layer through the tunnel barrier layer are successively laminated.

An interdevice shield layer 148 made of a material similar to that of the lower shield layer 330 is formed between the device 33 and waveguide 35. The interdevice shield layer 148 acts to shield the MR device 33 from magnetic fields generated by the electromagnetic coil device 34, so as to prevent exogenous noise from occurring at the time of reading.

The insulating layer 38 made of alumina or the like is formed between the shield layers 330, 334 on the side of the MR magnetic gap layer body 332 opposite from the medium-opposing surface S, on the side of the shield layers 330, 334, 148 opposite from the medium-opposing surface S, between the lower shield layer 330 and slider substrate 220, and between the interdevice shield layer 148 and optical waveguide 35.

When the MR multilayer body 332 includes a CIP-GMR multilayer film, upper and lower shield gap layers for insulation formed from alumina or the like are provided between the MR multilayer body 332 and the upper and lower shield layers 334, 330, respectively. Though not depicted, an MR lead conductor layer for supplying a sense current to the MR multilayer body 332 and taking out its reproduced output is also provided. When the MR multilayer body 332 includes a CPP-GMR multilayer film or TMR multilayer film, on the other hand, the upper and lower shield layers 334, 330 also function as upper and lower electrode layers, respectively. In this case, the upper and lower shield gap layers and MR lead conductor layer are unnecessary and omitted.

Formed on both sides in the track width direction of the MR multilayer body 332 is a hard bias layer (not depicted) made of a ferromagnetic material such as CoTa, CoCrPt, or CoPt for applying a longitudinal bias magnetic field for stabilizing magnetic domains.

The electromagnetic coil device 34 is preferably one used for perpendicular magnetic recording and comprises, as shown in FIG. 4, a main magnetic pole layer 340, a gap layer 341a, a coil insulating layer 341b, a coil layer 342, and an auxiliary magnetic pole layer 344.

The main magnetic pole layer 340 is a magnetic waveguide by which a magnetic flux induced by the thin-film coil 342 is guided to the recording layer of the magnetic disk (medium) to be written while being converged. Here, the end part of the main magnetic pole layer 340 on the medium-opposing surface S side is preferably made smaller than the other part in terms of the width in the track width direction (the sheet depth direction of FIG. 4) and the thickness in the laminating direction (the horizontal direction of FIG. 4). As a result, a fine, strong writing magnetic field adapted to higher recording density can be generated.

The end part on the medium-opposing surface S side of the auxiliary magnetic pole layer 344 magnetically connected to the main magnetic pole layer 340 forms a trailing shield part having a layer cross section wider than the other part of the auxiliary magnetic pole layer 344. The auxiliary magnetic pole layer 344 opposes the end part of the main magnetic pole layer 340 on the medium-opposing surface S side through the gap layer (cladding) 341a and coil insulating layer 341b made of an insulating material such as alumina.

The auxiliary magnetic pole layer 344 is constituted by an alloy made of two or three elements among Ni, Fe, and Co, an alloy mainly composed of them and doped with a predetermined element, or the like having a thickness of about 0.5 to 5 μm, for example, formed by frame plating, sputtering, or the like, for example.

The gap layer 341a, which separates the coil layer 342 and main magnetic pole layer 340 from each other, is constituted by $Al_2O_3$, DLC, or the like having a thickness of about 0.01 to 0.5 μm, for example, formed by sputtering, CVD, or the like, for example.

The coil layer 342 is constituted by Cu or the like having a thickness of about 0.5 to 3 μm, for example, formed by frame plating or the like, for example. The rear end of the main magnetic pole layer 340 and the part of the auxiliary magnetic pole layer 344 remote from the medium-opposing surface S are joined together, while the coil layer 342 is formed so as to surround this joint.

The coil insulating layer 341b separates the coil layer 342 and auxiliary magnetic pole layer 344 from each other and is constituted by an electrically insulating material such as thermally cured alumina or resist layer having a thickness of about 0.1 to 5 μm, for example.

Figure 5:
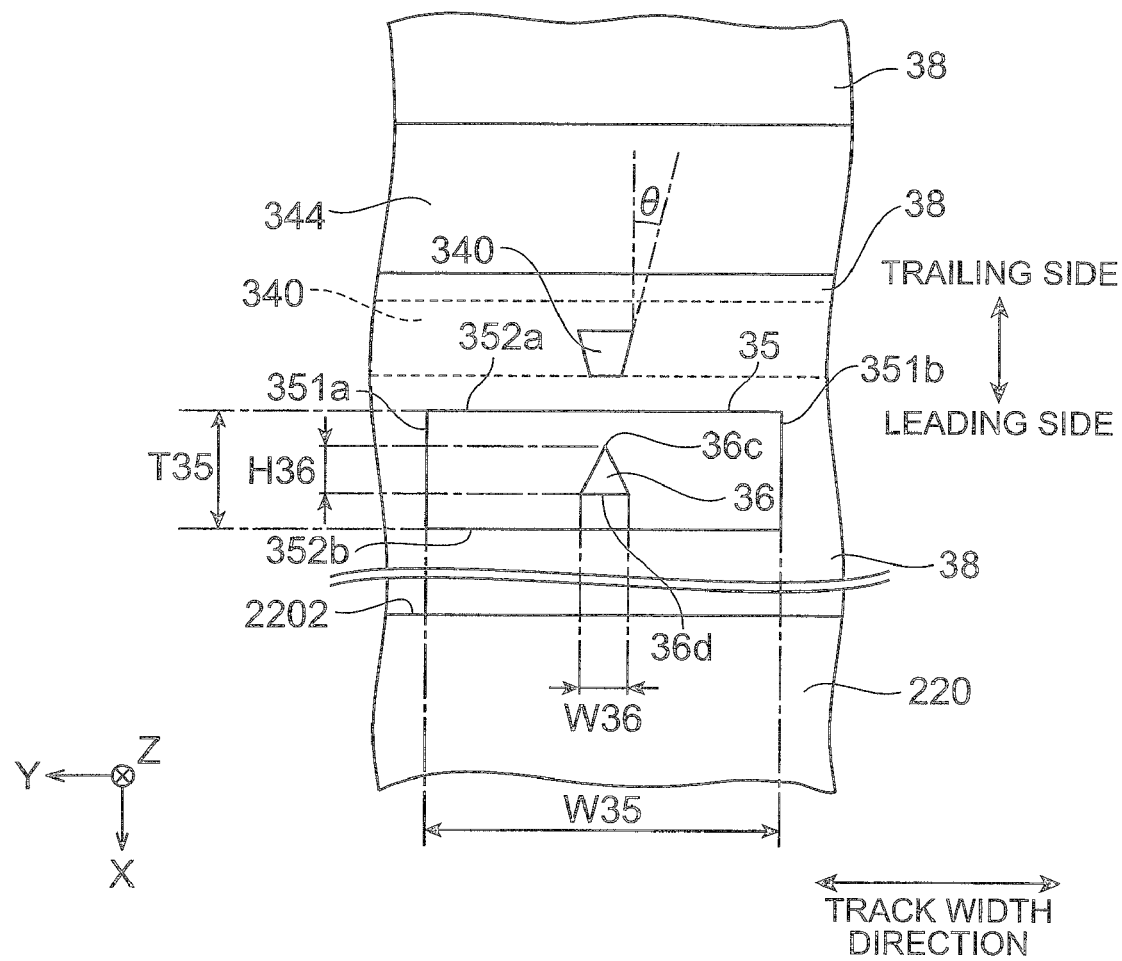
FIG. 5 is a plan view of a main part of the magnetic head as seen from the medium-opposing surface side.

FIG. 5 is a plan view of a main part of the magnetic head as seen from the medium-opposing surface side.

The leading end of the magnetic pole end part 340 on the medium-opposing surface S side is tapered such as to form an inverted trapezoid in which a side on the leading side, i.e., the slider substrate 220 side, is shorter than a side on the trailing side.

The end face of the magnetic pole end part 340 on the medium-opposing surface side is provided with a bevel angle θ so as not to cause unnecessary writing and the like in adjacent tracks under the influence of skew angles generated when driven by a rotary actuator. The bevel angle θ is about 15°, for example. In practice, the writing magnetic field is mainly generated near the longer side on the trailing side, while the length of the longer side determines the width of a writing track in the case of magnetic dominant recording.

Here, the main magnetic pole layer 340 is preferably constituted by an alloy made of two or three elements among Ni, Fe, and Co, an alloy mainly composed of them and doped with a predetermined element, or the like having a total thickness of about 0.01 to 0.5 μm at the end part on the medium-opposing surface S side and a total thickness of about 0.5 to 3.0 μm except for the end part, for example, formed by frame plating, sputtering, or the like, for example. The track width can be set to about 100 nm, for example.

As shown in FIG. 4, the optical waveguide 35, which is shaped like a rectangular plate in this embodiment, is positioned between the MR device 33 and electromagnetic coil device 34, and extends parallel to the integration surface 2202 from the medium-opposing surface S of the magnetic head part 32 to the surface 32a of the magnetic head part 32 on the side opposite from the medium-opposing surface S. In the waveguide 35, as shown in FIG. 5, two side faces 351a, 351b opposing each other in the track width direction and two side faces 352a, 352b parallel to the integration surface 2202 are in contact with the insulating layer 38 having a refractive index smaller than that of the waveguide 35 and functioning as a cladding for the waveguide 35.

Returning to FIG. 4, letting X, Y, and Z axes be the thickness, width, and longitudinal directions of the waveguide 35, respectively, the light emitted along the Z axis from the light-emitting surface of the laser diode 40 is incident on a light entrance surface 354. The waveguide 35 can guide the light incident on the light entrance surface 354 to a light exit surface 353, which is the end face on the medium-opposing surface S side, while reflecting the light by its side faces. The width W35 in the track width direction and thickness T35 of the waveguide 35 shown in FIG. 5 can be set to 1 to 200 μm and 2 to 10 μm, respectively, for example, while the height H35 shown in FIG. 4 can be set to 10 to 300 μm, for example.

The waveguide 35 is constituted by a dielectric material, formed by sputtering, for example, thoroughly having a refractive index n higher than that of the material forming the insulating layer 38. When the insulating layer 38 as a cladding is formed by $SiO_2$ (n=1.5), for example, the waveguide may be formed by $Al_2O_3$ (n=1.63). When the insulating layer 38 is formed by $Al_2O_3$ (n=1.63), the waveguide 35 may be formed by $Ta_2O_5$ (n=2.16), $Nb_2O_5$ (n=2.33), TiO (n=2.3 to 2.55), or $TiO_2$ (n=2.3 to 2.55). When the waveguide 35 is constituted by such a material, the propagation loss of laser light is reduced not only by favorable optical characteristics inherent in the material but also by the fact that the total reflection condition is attained at the interface, whereby the efficiency by which the near-field light occurs improves.

As shown in FIG. 5, the near-field-light-generating part 36 is a planar member arranged at the light exit surface 353 of the waveguide 35. As shown in FIG. 4, the near-field-light-generating part 36 is buried in the light exit surface 353 of the waveguide 35 so as to expose an end face at the medium-opposing surface S. As shown in FIG. 5, the near-field-light-generating part 36 exhibits a triangular form as seen from the medium-opposing surface S side and is formed by a conductive material. Examples of the conductive material include metals such as Au and alloys.

A base 36d of the near-field-light-generating part 36 is arranged parallel to the integration surface 2202 of the slider substrate 220, i.e., parallel to the track width direction, while a pointed end part 36c opposing the base 36d is arranged closer to the main magnetic pole layer 340 than is the base 36d. Specifically, the pointed end part 36c is arranged so as to oppose the leading edge of the main magnetic pole layer 340. A preferable form of the near-field-light-generating part 36 is an isosceles triangle in which two base angles at both ends of the base 36d are equal.

The height H36 of the triangle of the near-field-light-generating part 36 is sufficiently smaller than the wavelength of the incident laser light, preferably 20 to 400 nm. The width W36 of the base 36d is sufficiently smaller than the wavelength of the incident laser light, preferably 20 to 400 nm. The angle at the vertex yielding the pointed end 36c is 60 degrees, for example.

The thickness of the near-field-light-generating part 36 is preferably 10 to 100 nm. Such waveguide 359 near-field-light-generating part 36, and the like can easily be formed by photolithography techniques such as liftoff.

When the near-field-light-generating part 36 is irradiated with the light from the laser diode 40, near-field light is mainly generated by the pointed end part 36c. This seems to be because, when the near-field-light-generating part 36 is irradiated with light, electrons in the metal constituting the near-field-light-generating part 36 are subjected to plasma oscillations, so that electric fields are converged at its leading end part.

Though depending on the wavelength of incident laser light and the form of the waveguide 35, the near-field light generated by the near-field-light-generating part 36 has the highest intensity at the boundary of the near-field-light-generating part 36 as seen from the medium-opposing surface S in general. In this embodiment in particular, the electric field vector of light reaching the near-field-light-generating part 36 lies in the laminating direction (X direction) of the laser diode 40. Therefore, the strongest radiation of near-field light occurs in the vicinity of the leading end 36c. Namely, in a thermally assisted action in which the recording layer part of the magnetic disk is heated by light, the part opposing the vicinity of the leading end 36c becomes a major heating action part.

The electric field intensity of the near-field light is incomparably stronger than that of incident light, while this very strong near-field light rapidly heats an opposing local part of the magnetic disk surface. Consequently, the coercivity of this local part decreases to such a level as to enable writing by the writing magnetic field. Therefore, writing by the electromagnetic coil device 34 is allowed even when using a magnetic disk having a high coercivity for high-density recording. The near-field light reaches a depth of about 10 to 30 nm from the medium-opposing surface S toward the surface of the magnetic disk. Hence, at the current flying height of 10 nm or less, the near-field light can sufficiently reach the recording layer part. Thus generated near-field light has a width in the track width direction or medium moving direction on a par with the depth reached thereby, while its electric field intensity exponentially decays as it travels farther, and thus can heat the recording layer part of the magnetic disk very locally. In the case of optical dominant recording, the diameter of near-field light determines the writing track width.

The form of the near-field-light-generating part 36 can be modified in various ways without being restricted to the one mentioned above.

Light Source Unit

Constituents of the light source unit 23 in the thermally assisted magnetic head 21 will now be explained with reference to FIGS. 3, 4, and 6.

The light source unit 23 mainly comprises the light source supporting substrate 230, the laser diode (light source) 40 having a planar outer form and a resistance thermometer (temperature sensor) 260.

The light source supporting substrate 230 is a substrate made of AlTiC ($Al_2O_3$—TiC) or the like and has the bonding surface 2300 bonded to the back face 2201 of the slider substrate 220 as shown in FIG. 4. A heat insulating layer 230a made of alumina or the like is formed on the bonding surface 2300. An insulating layer 41 formed from an insulating material is provided on a device forming surface 2302 which is one side face when the bonding surface 2300 is taken as the bottom face. As shown in FIG. 3, electrode pads 47, 48, 265, 265 are formed on the insulating layer 41, while the laser diode 40 is secured onto the electrode pad 47.

Figure 6:
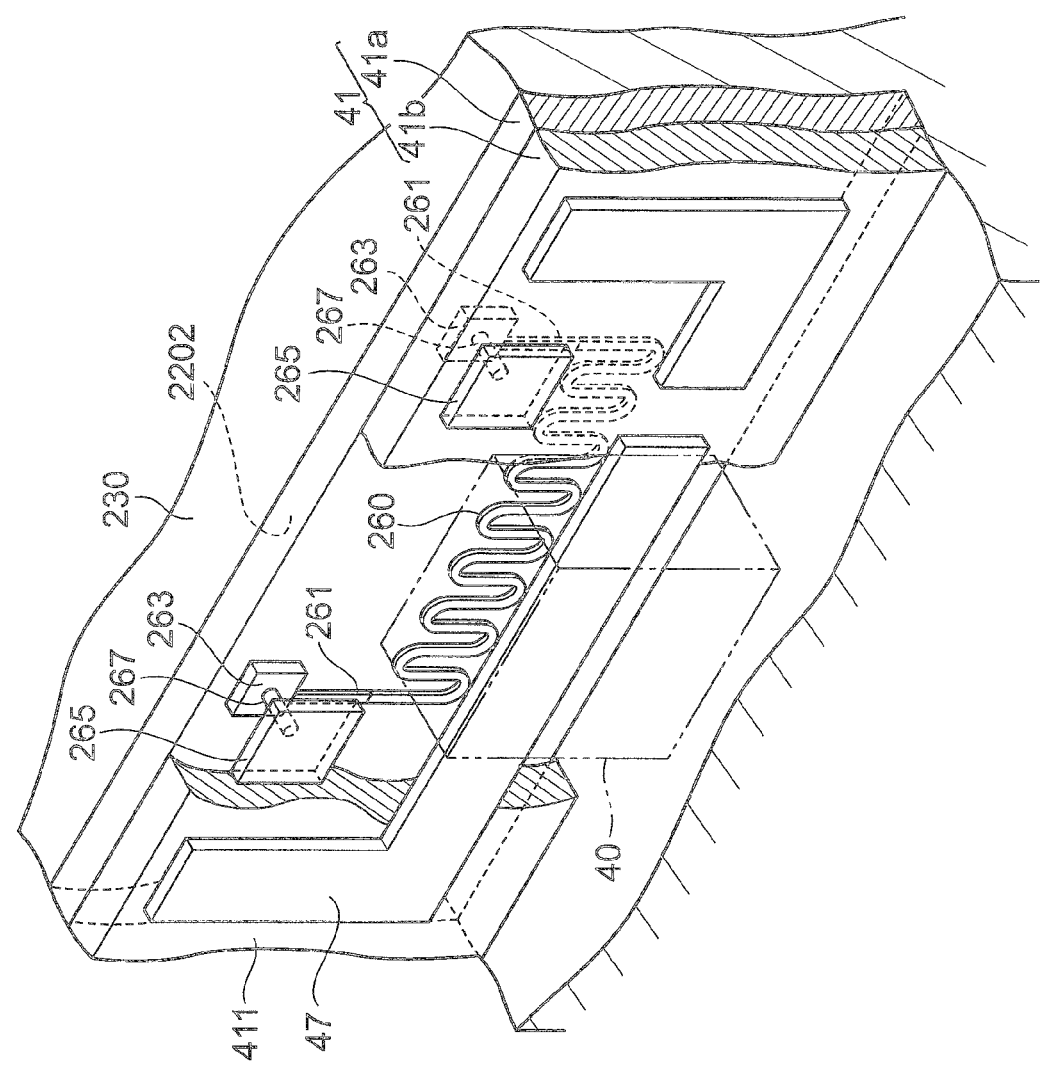
FIG. 6 is a partly broken perspective view of a main part of the thermally assisted magnetic head 21.

As shown in FIGS. 4 and 6, the insulating layer 41 comprises a lower insulating layer 41a and an upper insulating layer 41b. The resistance thermometer 260 is arranged between the lower and upper insulating layers 41a, 41b. The material for the insulating layer 41 is not restricted in particular, but preferably an electrically insulating material having a high thermal conductivity, examples of which include AlN, diamond-like carbon, and SiC. Though the thickness of the insulating layer 41 is not restricted in particular, the thickness of the upper insulating layer 41b is preferably 50 to 500 nm in view of the balance between thermal conductivity and electric insulation.

As shown in FIG. 6, the resistance thermometer 260 is a curvilinear pattern made of a thin film resistor and arranged between the laser diode 40 and light source supporting substrate 230, more specifically, formed on the lower insulating layer 41a and covered with the upper insulating layer 41b, so as to be buried in the insulating layer 41.

The material for the resistance thermometer 260 is not restricted in particular, whereby metal conductors such as silver, copper, gold, nickel, iron, aluminum, tantalum, and platinum and semiconductors such as silicon can be used. In particular, platinum, which is excellent in linearity of resistance value change with respect to temperature, and its alloys are preferably used. Though not limited in particular, the thickness of the film-like resistance thermometer 360 is preferably about 10 to 100 nm, since the resistance value may become too low when the thickness is too large, while defects may occur when the thickness is too small. Preferably, the resistance thermometer 360 is arranged in a meandering fashion, so as to yield a certain length, e.g., a length of 150 to 600 µm. The line width can be set to 1 to 10 µm, for example. The resistance thermometer 260 is buried at a position opposing the laser diode 40.

Leads 261 made of gold or the like having a resistivity lower than that of the resistance thermometer 260 are arranged at both ends of the resistance thermometer 260, while respective electrode pads 263 are formed at the end parts of the leads 261. The leads 261 and electrode pads 263 are also formed on the lower insulating layer 41a and covered with the upper insulating layer 41b, so as to be buried in the insulating layer 41. Such resistance thermometer 260, leads 261, electrode pads 263, and the like can easily be formed by photolithography or the like.

A pair of electrode pads 265 are formed on a surface of the upper insulating layer 41b, i.e., a surface 411 which is a surface of the insulating layer 41 and intersects the medium-opposing surface S, or the surface 411 parallel to the integration surface 2202 of the slider substrate 220, and oppose the buried electrode pads 263, respectively. The electrode pads 263 are electrically connected to their corresponding electrode pads 265 through via holes 267 penetrating through the upper insulating layer 41b.

As shown in FIG. 4, the electrode pad 47 is electrically connected to the light source supporting substrate 230 through a via hole 47a provided within the insulating layer 41. The electrode pad 47 also functions as a heat sink for transferring heat occurring at the time of driving the laser diode 40 toward the light source supporting substrate 230 through the via hole 47a. Since the electrode pad 47 is electrically connected to the light source supporting substrate 230, the potential of the light source supporting substrate 230 can be adjusted to the ground potential, for example, through the electrode pad 247.

As shown in FIG. 6, the electrode pad 47 is formed at the center part of the surface 411 of the insulating layer 41 so as to extend in the track width direction. On the other hand, the electrode pad 48 is formed at a position separated in the track width direction from the electrode pad 47. As shown in FIG. 3, the electrode pads 47, 48 farther extends toward the flexure 201 for connection with the flexure 201 by solder reflow.

Each of the electrode pads 47, 48, 263, 265 can be constructed by a layer of Au, Cu, or the like having a thickness of about 1 to 3 µm formed by vacuum vapor deposition, sputtering, or the like, for example, on a foundation layer having a thickness of about 10 nm made of Ta, Ti, or the like, for example.

The laser diode 40 is electrically connected onto the electrode pad 47 through a solder layer 42 (see FIG. 4) made of a conductive solder material such as Au—Sn. Here, the laser diode 40 is arranged with respect to the electrode pad 47 so as to cover only a part thereof. Namely, as shown in FIG. 6, the laser diode 40 is arranged on the resistance thermometer 260.

Figure 7:
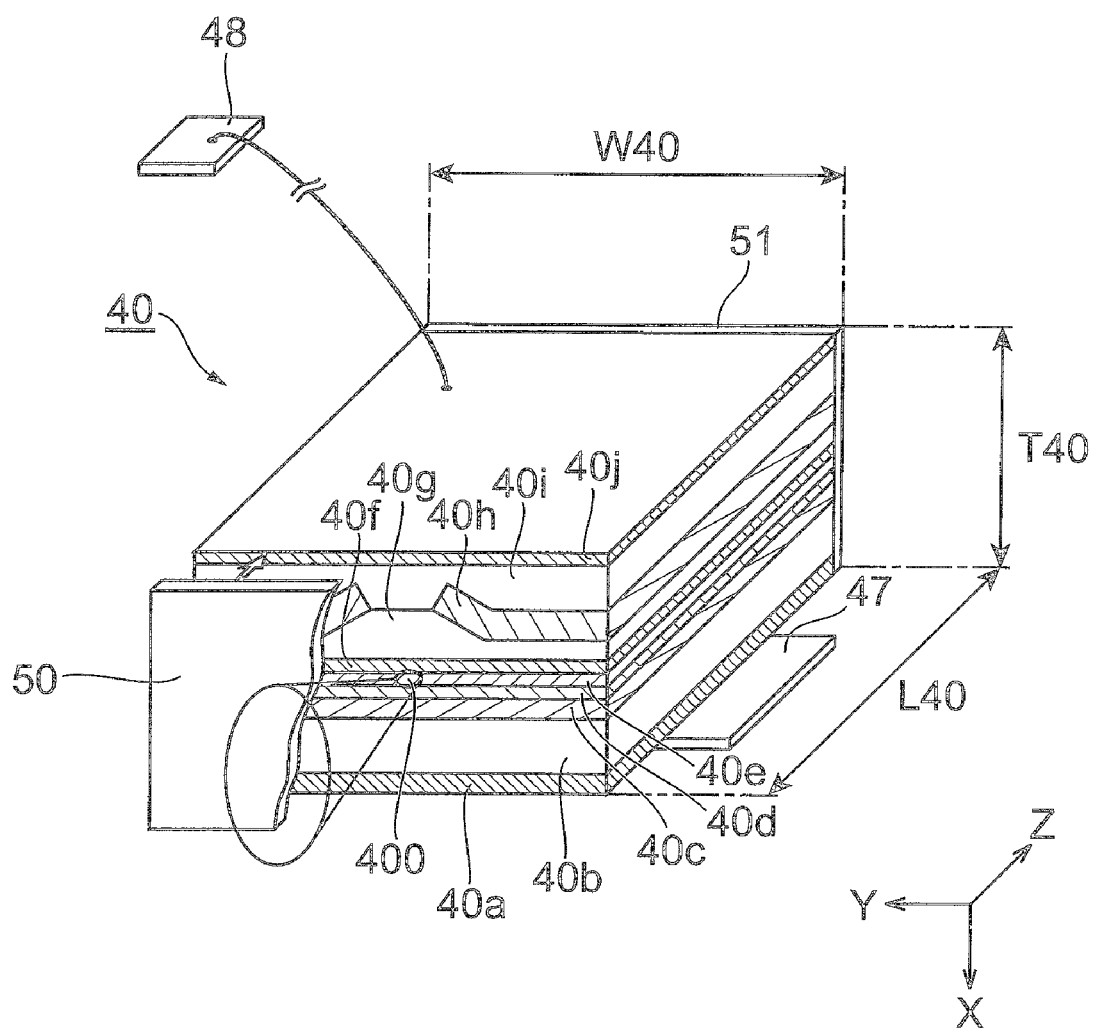
FIG. 7 is a perspective view of a laser diode 40.

FIG. 7 is a perspective view of the laser diode 40.

The laser diode 40 may have the same structure as one typically used for optical disk storage. For example, the laser diode 40 has a structure in which an n-electrode 40a, an n-GaAs substrate 40b, an n-InGaAlP cladding layer 40c, a first InGaAlP guide layer 40d, an active layer 40e made of a multiple quantum well (InGaP/InGaAlP) or the like, a second InGaAlP guide layer 40f, a p-InGaAlP cladding layer 40g, an *n-GaAs current blocking layer 40h, a p-GaAs contact layer 40i, and a p-electrode 40j are successively laminated. Reflective films 50, 51 made of $SiO_2$, $Al_2O_3$, or the like for pumping oscillations by total reflection are formed in front and rear of a cleavage surface of the multilayer structure. A light exit end 400 from which the laser light is emitted is provided with an opening at a position corresponding to the active layer 40e in one reflective film 50. When a voltage is applied to thus constructed laser diode 40 in the thickness direction, the laser light is emitted from the light exit end 400.

As regards the wavelength $\lambda_L$ of laser light to be emitted, a laser diode adapted to emit laser light having the appropriate wavelength $\lambda_L$ is selected in view of the form and metal material of the near-field-light-generating part 36 and the refractive index n of the material constituting the waveguide 35 as mentioned above.

As mentioned above, the laser diode 40 has a width (W40) of about 200 to 350 µm, a length (or depth L40) of 250 to 600 µm, and a thickness (T40) of about 60 to 200 µm, for example. Here, the width W40 of the laser diode 40 can be reduced to about 100 µm, for example, while its lower limit is the distance between the opposing ends of the current blocking layer 40h. However, the length of the laser diode 40 is related to the current density and cannot be made so small. In any case, it will be preferred if the laser diode 40 secures a considerable size taking account of handling at the time of mounting.

For driving the laser diode 40, a power supply in the hard disk drive can be used. In practice, the hard disk drive is typically equipped with a power supply of about 2 V, for example, whose voltage is high enough for laser oscillations. The power consumption of the laser diode 40 is about several tens of mW and thus can sufficiently be covered by the power supply in the hard disk drive.

The n-electrode 40a of the laser diode 40 is secured to the electrode pad 47 by the solder layer 42 (see FIG. 4) made of AuSn or the like. Here, the laser diode 40 is secured to the light source supporting substrate 230 such that the light exit end (light exit surface) 400 of the laser diode 40 faces down (in the −Z direction) in FIG. 4, i.e., the light exit end 400 is parallel to the bonding surface 2300, whereby the light exit end 400 can oppose the light entrance surface 354 of the waveguide 35 in the slider 22. For securing the laser diode 40 in practice, for example, a vapor deposition film of an AuSn alloy having a thickness of about 0.7 to 1 µm is formed on the surface of the electrode pad 47, and the laser diode 40 is mounted thereon and then secured thereto by heating to about 200 to 300° C. with a hot plate or the like under a hot air blower.

The p-electrode 40j of the laser diode 40 is electrically connected to the electrode pad 48 by a bonding wire. Without bonding wires, the laser diode 40 may be provided with steps, so as to reduce the distance between the electrode pad 48 and the p-electrode 40j of the laser diode 40, and they may be electrically connected to each other with solder of AuSn or the like. The electrode pad 47 may be connected to the p-electrode 40j instead of the n-electrode 40a. In this case, the n-electrode 40a is connected to the electrode pad 48 by a bonding wire or the like.

When soldering with the above-mentioned AuSn alloy, the light source unit is heated to a high temperature around 300° C., for example. The light source unit 23 is manufactured separately from the slider 22 in this embodiment, whereby the magnetic head part within the slider is not adversely affected by the high temperature. Also, since the magnetic head part 32 and the light source unit 23 are separated from each other, the magnetic head and the state of mounting the light diode in the light source unit can be inspected separately from each other, whereby the total yield can be improved by combining non-defective products together.

The back face 2201 of the slider 22 and the bonding surface 2300 of the light source unit 23 are bonded to each other by an adhesive layer 44 (see FIG. 4) such as UV-curable adhesive, for example, while the light exit end 400 of the laser diode 40 is arranged so as to oppose the light entrance surface 354 of the waveguide 35.

The structures of the laser diode 40 and electrode pads are not limited to those in the above-mentioned embodiment as a matter of course. For example, the laser diode 40 may have a different structure using other semiconductor materials such as those based on GaAlAs. Other brazing materials can be used for soldering the laser diode 40 to electrodes. The laser diode 40 may be formed by epitaxially growing a semiconductor material directly on a unit substrate.

The slider 22 and light source unit 23 may have any sizes. For example, the slider 22 may be a so-called femto slider having a width in the track width direction of 700 µm, a length (depth) of 850 µm, and a thickness of 230 µm. The light source unit 23 may have substantially the same width and length as those of the slider in this case. In practice, a conventionally employed laser diode typically has a width of about 250 µm, a length (depth) of about 350 µm, and a thickness of about 65 µm, for example. The laser diode 40 having such a size can fully be mounted on a side face of the light source supporting substrate 230 having such a size. The bottom face of the light source supporting substrate 230 may be provided with a groove, within which the laser diode 40 can be placed.

For example, a spot of a far-field pattern of laser light having reached the light entrance surface 354 of the waveguide 35 may have a diameter in the track width direction of about 0.5 to 1.0 µm, for example, and a diameter orthogonal thereto of about 1 to 5 µm, for example. Preferably, in conformity thereto, the waveguide 35 receiving the laser light has a thickness T35 of about 2 to 10 µm, for example, which is greater than the spot, and a width (W35) in the track width direction of about 1 to 200 µm, for example.

Electric Connections between Thermally Assisted Magnetic Head and Flexure

As shown in FIG. 3, one of leads constituting the wiring member 203 is electrically connected to the electrode pad 247, while the electrode pad 247 is connected to the electrode pad 47 of the light source unit 23 through a reflow solder piece R. Another lead is electrically connected to the electrode pad 248, while the electrode pad 248 is connected to the electrode pad 48 through a reflow solder piece R. When a driving current is supplied between the electrode pads 247, 248, the laser diode 40 emits light.

Another pair of leads constituting the wiring member 203 are connected to respective electrode pads 249, while the electrode pads 249 are electrically connected to their corresponding electrode pads 265 through reflow solder pieces R. As a consequence, a voltage can be applied to both ends of the resistance thermometer 260.

Another pair of leads constituting the wiring member 203 are connected to the respective electrode pads 371 through electrode pads 237 and bonding wires, whereby a voltage can be applied to both ends of the electromagnetic coil device 34 (see FIG. 4 and the like). When a voltage is applied between a pair of electrode pads 371, the electromagnetic coil device 34 as a magnetic recording device is energized, whereby a writing magnetic field is generated.

Another pair of leads constituting the wiring member 203 are connected to the respective electrode pads 373 through electrode pads 238 and bonding wires, whereby a voltage can be applied to both ends of the MR device 33 (see FIG. 4). When a voltage is applied between a pair of electrode pads 373, a sense current flows through the MR device 33. Information written in the recording medium can be read by causing the sense current to flow through the MR device 33.

Read/Write Control Circuit

Figure 8:
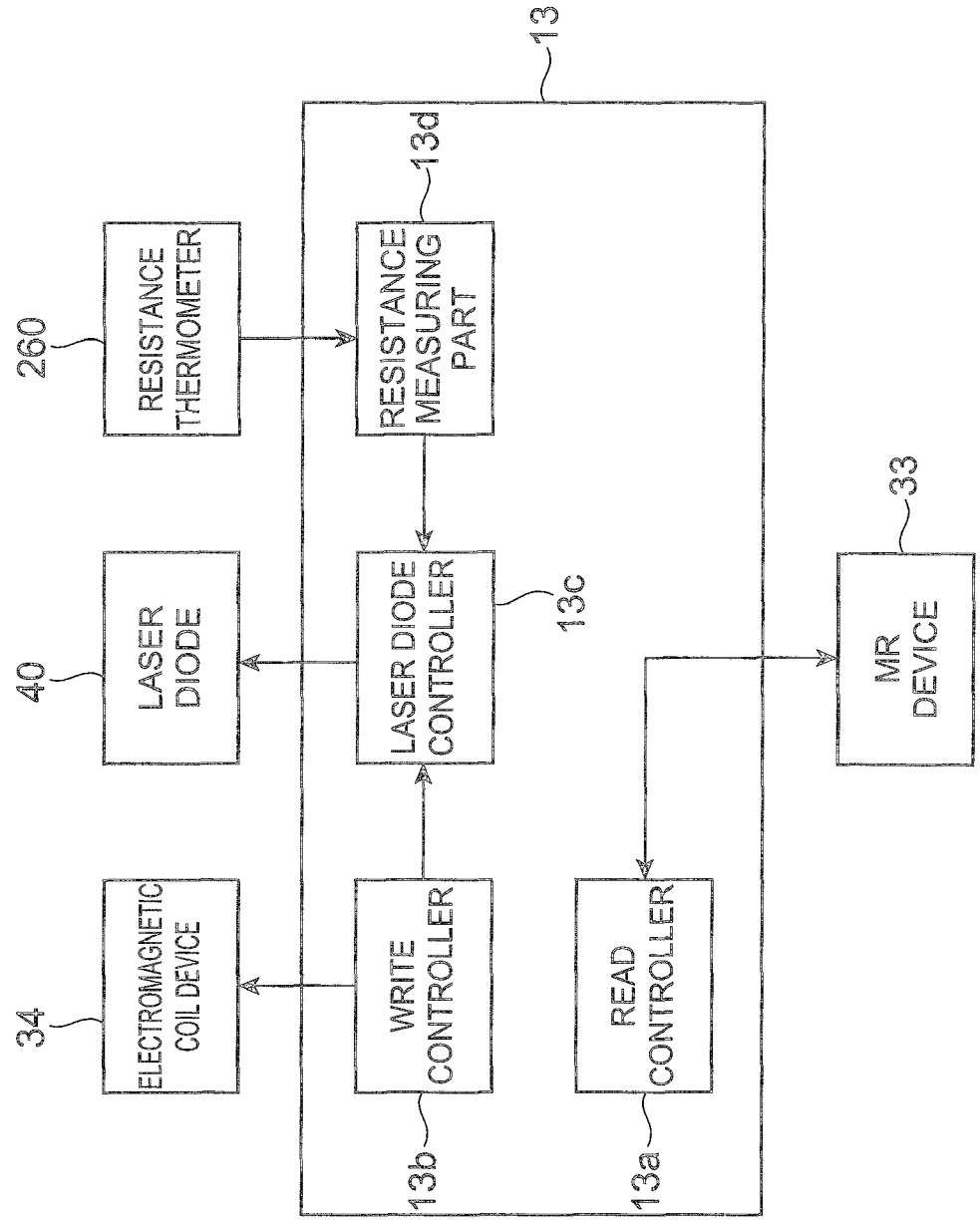
FIG. 8 is a functional block diagram of a read/write controller and thereabout.

A functional block diagram of the read/write control circuit 13 and thereabout will now be explained with reference to FIG. 8. The read/write control circuit 13 mainly comprises a read controller 13a, a write controller 13b, a laser diode controller (light source controller) 13c, and a resistance measuring part 13d, while their functions are realized by a computer or the like. The read controller 13a, which is connected to the IBM device 33, causes an appropriate sense current to flow through the latter and receives an MR signal from the magnetic recording medium.

The resistance measuring part 13d, which is connected to the resistance thermometer 260, applies a constant voltage to the latter and detects a current value, for example, so as to acquire a resistance value of the resistance thermometer 260. The resistance measuring part 13d may convert the resistance value of the resistance thermometer 260 into a temperature as well.

The write controller 13b, which is connected to both ends of the coil layer 342 of the electromagnetic coil device 34, causes a current to flow through the coil layer 342 at a given timing and provides the recording medium with a writing magnetic field from the main magnetic pole. The write controller 13b, which is connected to the laser diode controller 13c, generates laser light from the laser diode 40 at a given timing.

The laser diode controller 13c supplies a given electric power to the laser diode 40 at a given timing in response to a demand from the write controller 13b, so as to cause the laser diode 40 to generate the laser light. The laser diode controller 13c is also connected to the resistance measuring part 13d, and regulates a current supplied to the laser diode and the like such that the light emitted from the laser diode 40 attains a constant intensity according to the resistance value or temperature of the resistance thermometer 260 acquired from the resistance measuring part 13d.

The output of laser light from the laser diode 40 greatly depends on the temperature of the laser diode, so as to vary with the temperature even when the same current is applied. Therefore, according to the resistance value or temperature acquired from the resistance measuring part 13d, the current supplied to the laser diode 40 is adjusted so that the output of laser light becomes constant. Specifically, for example, the current value may be adjusted according to a data table showing a relationship between the resistance value of the resistance thermometer 260 or the temperature of the laser diode 40 and the supplied current value required for keeping a constant laser light output, or a function including the resistance value or temperature as a variable concerning the supplied current value required for keeping a constant laser light output may be prepared beforehand and then the current value may be adjusted according to this function.

Preferably, such laser light power control is carried out at each laser light irradiation or predetermined time intervals.

Operations

Operations of the thermally assisted magnetic head 21 in accordance with this embodiment will now be explained.

At the time of a writing or recording action, the thin-film magnetic head 21 hydrodynamically floats by a predetermined flying height above the surface of the rotating magnetic disk (medium) 10. Here, the ends of the MR device 33 and electromagnetic coil device 34 on the medium-opposing surface S side oppose the magnetic disk 10 with a minute spacing therefrom, so as to effect reading and writing by sensing and applying a data signal magnetic field, respectively.

When writing a data signal, the laser light propagated from the light source unit 23 through the optical waveguide 35 reaches the near-field-light-generating part 36, whereby near-field light is generated by the near-field-light-generating part 36. This raises the temperature in a predetermined recording area of the magnetic recording medium opposing the medium-opposing surface, thereby temporarily lowering the coercivity of the recording area. Therefore, when the electromagnetic coil device 34 is energized during this coercivity decreasing period, so as to generate a writing magnetic field, information can be written in the recording area.

When writing is performed on the magnetic disk having a high coercivity by the thin-film magnetic head for perpendicular magnetic recording while employing the thermally assisted magnetic recording scheme, a recording density of 1 Tbits/inch$^2$ class, for example, can be achieved by extremely finely dividing recording bits.

The laser light propagating in a direction parallel to the layer surface of the waveguide 35 can be made incident on the light entrance surface (end face) 354 of the waveguide 35 in the slider 22 by using the light source unit 23 in this embodiment. Namely, laser light having an appropriate size and direction can reliably be supplied in the thermally assisted magnetic head 21 constructed such that the integration surface 2202 and the medium-opposing surface S are perpendicular to each other. This makes it possible to realize thermally assisted magnetic head with a high heating efficiency in the recording layer of the magnetic disk.

Since the resistance thermometer 260 for measuring the temperature of the laser diode 40 is provided, this embodiment makes it easier for the light from the laser diode 40 to keep a constant output according the temperature information from the resistance thermometer 260 regardless of the temperature of the laser diode 40. Since the light source unit 23 securing the laser diode 60 has the resistance thermometer 260 by itself, the temperature of the laser diode 40 can be measured accurately by the resistance thermometer 260, so as to enable highly accurate temperature compensation. Since the laser diode is apt to generate heat upon energization and vary its temperature, while its light output fluctuates greatly depending on the temperature, output stabilization by highly accurate temperature compensation is essential for improving the reliability.

Since the light source unit 23 is arranged between the light source supporting substrate 230 and laser diode 40, the laser diode 40 and resistance thermometer 260 can easily be arranged closer to each other, so that the temperature of the laser diode 40 can be measured very accurately. Such a structure is easy to manufacture and does not increase the cost so much.

The resistance thermometer 260 employed as the temperature sensor is easy to be made smaller and thinner, so as to be suitable in the thermally assisted magnetic head to be made finer in particular.

The present invention can be modified in various manners without being restricted to the above-mentioned embodiment.

For example, the light source is not limited to the laser diode, but can be embodied by other light-emitting devices such as LED.

The temperature sensor is not limited to the resistance thermometer, but can be embodied by other temperature sensors such as thermocouple.

In addition to the resistance thermometer 260 located close to the laser diode 40, another temperature sensor such as resistance thermometer may be provided at a location remote from the laser diode 40, so as to control the light output of the laser diode 40 according to the difference between resistance values and the like of these temperature sensors. For example, the additional temperature sensor may be arranged at an end part instead of the center part in the track width direction within the insulating layer 41.

The resistance thermometer 260 as the temperature sensor is not necessarily positioned between the laser diode 40 and light source supporting substrate 230 as long as the light source unit 23 is provided with the temperature sensor. For example, resistance thermometers may be provided at both side faces in the track width direction of the light source supporting substrate 230. In this case, the temperature can be measured accurately if a substrate made of AlN or the like having a thermal conductivity higher than that of the slider is used.

Namely, the slider substrate 220 and light source supporting substrate 230 may employ respective substrates made of materials different from each other, though the same substrate made of AlTiC is used in the above-mentioned embodiment. Letting $\lambda s$ and $\lambda l$ be the respective thermal conductivities of the slider substrate 220 and light source supporting substrate 230, it will be preferred if $\lambda s \leq \lambda l$. This makes it easy to transfer the heat generated by the laser diode 40 to the outside through the light source supporting substrate 230 while keeping it as much as possible from being transmitted to the slider substrate 220.

The electromagnetic coil device 34 may be one for longitudinal magnetic recording. In this case, lower and upper magnetic pole layers are provided instead of the main magnetic pole layer 340 and auxiliary magnetic pole layer 344, and a writing gap layer is held between the end parts on the medium-opposing surface S side of the lower and upper magnetic pole layers. Writing is effected by a leakage magnetic field from the position of the writing gap layer.

The near-field-generating part may employ a so-called "bowtie" structure in which a pair of triangular or trapezoidal plates are arranged such that their vertexes or shorter sides oppose each other while being separated by a predetermined distance therebetween. The near-field-generating part may have a minute opening instead of the plate. The laser light may be allowed to directly impinge on the recording medium without providing the near-field-generating part.

Though provided by one layer in FIG. 4 and the like, the coil layer 342 may be constituted by two or more layers or a helical coil.

The heat insulating layer 230a may be formed on the back face 2201 of the slider substrate 220 or totally omitted.

For bonding the light source unit 23 and slider 22 to each other, adhesives other than the UV-curable adhesive, e.g., the solder layer made of AuSn or the like used for bonding the laser diode 40 and electrode pad 47 to each other, may also be employed.

Though employed as a linear waveguide in the above-mentioned embodiment the waveguide 35 may be a parabolic waveguide whose outer form within the YZ plane exhibits a parabola with the near-field-generating part arranged at its focal position, or have an elliptical outer form or the like within the YZ plane or a taper form in which the leading end closer to the medium is tapered. The hard disk drive equipped with the above-mentioned thermally assisted magnetic head and HGA can fully prevent writing errors from occurring because of insufficiently heating the recording medium during writing actions, while fully keeping side erasure from occurring.

Though the above-mentioned embodiment is a thermally assisted magnetic head having a slider and a light source unit, the thermally assisted magnetic head may incorporate a magnetic recording device, a waveguide, a light source, and a temperature sensor in one slider.

All of the forgoing embodiments show the present invention illustratively but not restrictively, whereas the present invention can be carried out in a variety of other modified and altered manners. Therefore, the scope of the present invention is defined by the appended claims and equivalents thereof.

What is claimed is:

1. A thermally assisted magnetic head comprising a magnetic recording device for generating a magnetic field, a light source for supplying light, and a temperature sensor for measuring a temperature of the light source.

2. A thermally assisted magnetic head according to claim 1, further comprising:
   a slider substrate; and
   a light source supporting substrate secured to a surface of the slider substrate on the side opposite from a medium-opposing surface;
   wherein a side face of the medium-opposing surface in the slider substrate is provided with the magnetic recording device and a waveguide for receiving the light from the side opposite from the medium-opposing surface and guiding the light to the medium-opposing surface side;
   wherein the light source is secured to the light source supporting substrate and supplies the light to the waveguide; and
   wherein the temperature sensor is secured to the light source supporting substrate.

3. A thermally assisted magnetic head according to claim 2, wherein the temperature sensor is provided between the light source supporting substrate and the light source.

4. A thermally assisted magnetic head according to claim 3, wherein the temperature sensor is arranged in an insulating layer provided between the light source supporting substrate and the light source.

5. A thermally assisted magnetic head according to claim 1, wherein the temperature sensor is a resistance thermometer.

6. A head gimbal assembly comprising:
   the thermally assisted magnetic head according to claim 1; and
   a suspension for supporting the thermally assisted magnetic head.

7. A hard disk drive comprising:
   the head gimbal assembly according to claim 6; and
   a light source controller for controlling a light output of the light source according to information from the temperature sensor.

8. A light source unit for a thermally assisted magnetic head, the light source unit comprising:
   a light source supporting substrate;
   a light source secured to the light source supporting substrate; and
   a temperature sensor for measuring a temperature of the light source.

9. A light source unit for a thermally assisted magnetic head according to claim 8,
   wherein the light source is secured to the light source supporting substrate through an insulating layer; and
   wherein the temperature sensor is provided within the insulating layer.

* * * * *